Patented Jan. 26, 1926.

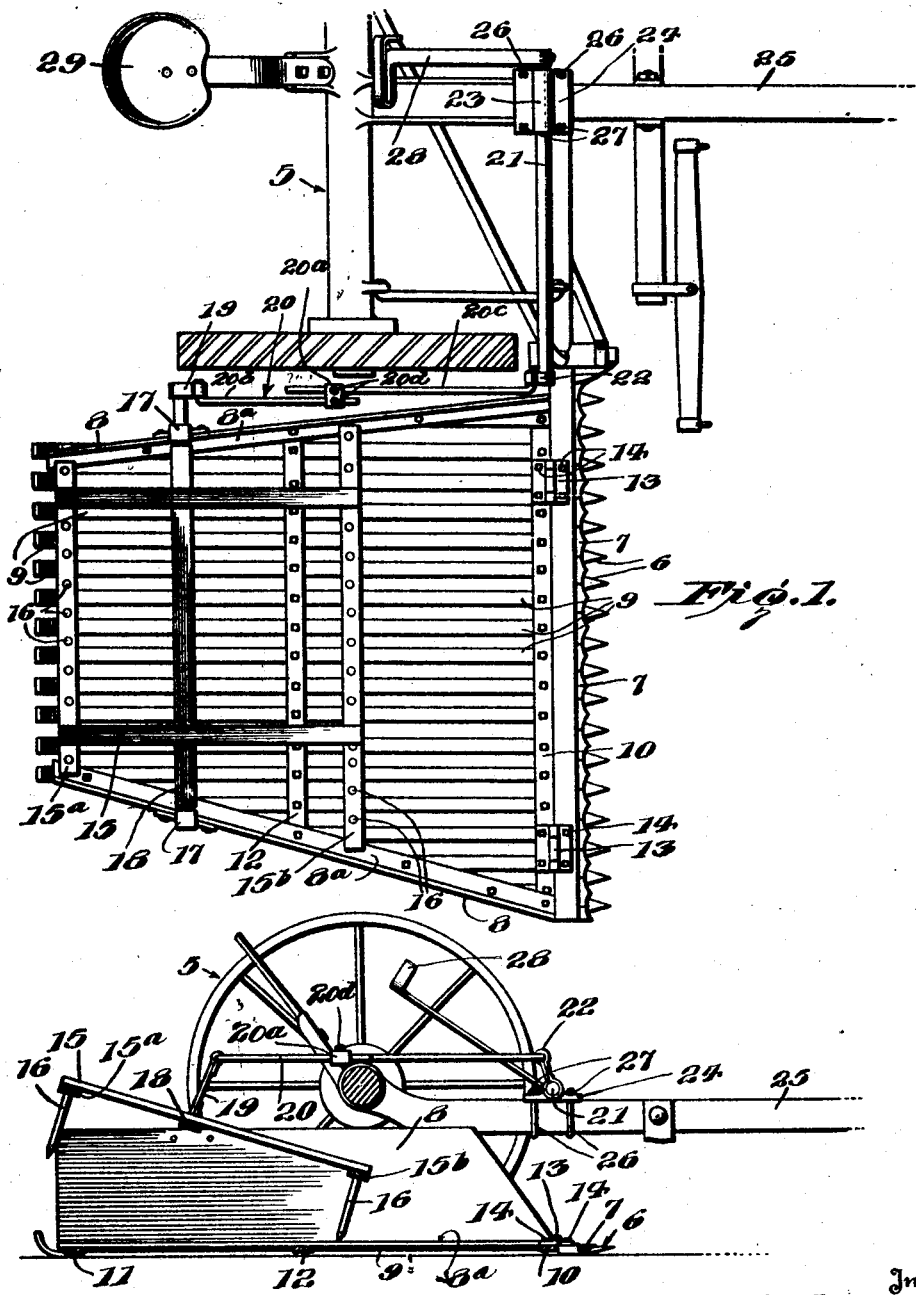

1,570,965

UNITED STATES PATENT OFFICE.

CRIST HERMINGHUYSEN, OF VAN WERT, OHIO.

BUNCHING ATTACHMENT FOR MOWING MACHINES.

Application filed December 5, 1923. Serial No. 678,739.

*To all whom it may concern:*

Be it known that I, CRIST HERMINGHUYSEN, a citizen of the United States, residing at Van Wert, in the county of Van Wert and State of Ohio, have invented new and useful Improvements in Bunching Attachments for Mowing Machines, of which the following is a specification.

My invention relates to bunching attachments for mowing machines and the like, being particularly adaptable to machines of the finger bar type, although capable of application to other types of machines.

The difficulty with the majority of bunching attachments now in use is that they fail to efficiently concentrate the hay or clover or other material in bunches, but leave a more or less scattering trail of the substance leading from each bunch. This is due to the fact that the hay releasing device fails to function quick enough to prevent the passage of hay through the device after the bunch has been released before the bunch holding device has been returned to holding position. It is therefore the primary object of my invention to provide a bunching device whereby the bunches will be released in an expeditious manner, and whereby there will be no scattering of hay between the bunches which necessitates the use of a hand rake in order to prevent wastage of the hay so scattered.

Another object of the invention is the provision of a buncher which is very simple in construction, embodying but few parts, the whole device being strong and durable yet inexpensive of construction.

The invention also has for an object to furnish a device of this character which may be readily attached and detached from a mowing machine or other farm machine so that the same can be used for other purposes which do not require the use of a buncher.

Other objects and advantages will be brought out hereinafter, the various features of novelty which characterize my invention being pointed out with particularity in the claims annexed to and forming a part of this specification. For a better understanding of the invention, however, and of the advantages possessed by it, reference should be had to the accompanying drawing and descriptive matter in which I have illustrated and described what I now regard as the preferred embodiment of my invention.

In the drawing,

Figure 1 is a plan view of a mowing machine showing the application of my buncher thereto, and Fig. 2 is a cross section of the mowing machine illustrating my buncher in side elevation.

Referring specifically to the drawings, wherein like reference characters have been used to designate like parts throughout, a fragment of a mowing machine is indicated at 5, the same being of standard design and having the usual finger bar 6 which houses the cutter bar 7 which latter is reciprocated back and forth by the usual or any preferred means, the specific mowing machine forming no part of the present invention.

Coming now to my improved buncher, it will be noted that same comprises a frame embodying side members 8, the bottom edges of which are bent laterally as at $8^a$ to form flanges for attachment to the bed of the frame, which latter is made up of a plurality of longitudinally disposed metal slats 9, the ends of which are attached to cross slats 10 and 11. A medial reinforcing cross slat 12 may be provided to lend rigidity to the bed. These slats will be preferably made of spring metal so that the frame will be relatively light and durable. The side members 8 will preferably be of metal, but can be made of wood if desired and provided with angle irons for attachment to the bed of the frame.

The frame above described is adapted to receive the hay, clover or other fodder which is cut by the cutter bar, and is preferably hingedly attached to the finger bar 6 by means of hinges 13 which are carried by the cross slat 10 and attached to the rear portion of the finger bar back of the cutter bar by means of bolts 14. The purpose of this hinged attachment of the frame is to permit the same to be pulled along by the finger bar so as to follow the contour of the terrain without tending to twist the finger bar and weaken its attachment to the mowing machine.

The means for bunching the hay and for releasing the bunches will now be described, the same comprising essentially a rectangular frame 15 having cross members at either end as denoted at $15^a$ and $15^b$, each of such cross members being provided with a plurality of teeth 16. A transverse shaft in bearings 17 carried by the side members 8 is clearly shown in Fig. 1. The shaft, per se, is indicated by numeral 18 and it will be understood that the same will be rigidly attached to the frame 15, it being noted that the shaft is so positioned as to be nearer the rear portion of the frame than the forward portion, the purpose of this construction being to permit the forward end of the frame 15 to be normally inclined toward the bed of the hay receiving frame so that its teeth 16 will rest upon the slats 9. The normal position of the frame 15 is clearly illustrated in Fig. 2, and it will be evident that the hay passing into the buncher over the finger bar 6 will be banked up against the teeth 16 of the front cross member 15$^b$. The rear end of the frame 15 will normally be in raised position as shown in Fig. 2, the purpose of this particular construction being explained hereinafter.

The inner end of the shaft 18 is extended through its bearing 17 and is provided with a crank arm 19 which carries an adjustable connection comprising two connected rods 20$^b$ and 20$^c$ which receive longitudinal movement from a rock shaft 21. This rock shaft 21 carries a crank 22 having an operating connection with the end of rod 20$^c$. As indicated in Fig. 1 the rock shaft 21 is carried in a bearing 23 upon a plate 24 which is adapted to be clamped to the tongue 25 of the mowing machine by means of U-bolts 26 carried by the plate 24 as shown in Fig. 2, the same receiving nuts 27. A foot pedal 28 is rigidly attached to the other end of the rock shaft 21 for operation by the driver from the seat 29. The means for adjusting the length of the connection 20$^b$, 20$^c$ between the cranks 19 and 22 is preferably a block 20$^a$ having two transverse bores through which the ends of the rods 20$^b$, 20$^c$ pass, they being held in predetermined position by means of set screws 20$^d$ or similar clamping expedients.

From the foregoing description read in connection with the accompanying drawing, it will be readily appreciated that my buncher may be conveniently attached to a mowing machine and detached therefrom without materially altering the standard construction thereof. The operation of the buncher may be briefly summarized as follows. The device being attached as indicated in the foregoing description, the same is driven through a hay or clover field and the fodder cut by the cutter bar passing rearwardly into the receiving frame and rests against the teeth 16 carried by the cross bar 15$^b$ of the frame 15. After a sufficient quantity of the fodder has been bunched against the teeth 16, the operator steps on the foot pedal 28 rocking the frame 15 rearwardly to raise the front end thereof to permit the fodder to pass to engagement with the teeth 16 of the rear cross bar 15$^a$ which are moved to engagement with the slats 9 when bar 15$^b$ is rocked upwardly therefrom. The bunch that had previously rested against the teeth at the front end of the frame 15 now passes rearwardly and is held by the teeth at the rear end of the frame. It will be understood that the mowing machine will be in motion throughout the operation and thus such hay as is cut while the front teeth 16 are up will pass rearwardly against the rear teeth. Upon releasing the foot pedal 28 the front end of the frame 15 quickly lowers by gravity to position with its teeth 16 upon the slats 9 and the passage of hay toward the bunch in the rear is promptly cut off so as to leave a definite and clearly defined bunch without any scattering trail of hay leading therefrom. The toothed cross member 15$^b$, as will be appreciated, acts as a primary stop or bunch forming expedient while the toothed cross member 15$^a$ functions as a bunch holding or concentrating member against which the cut hay packs when the member 15$^b$ is raised. When the foot pedal 26 is released and the member 15$^b$ falls the material before it will be prevented from following the clearly defined bunch which was formed against the rear member 15$^a$. Bunches of a uniform size may be formed by keeping the foot pedal 26 depressed until the hay has been concentrated or packed from the rear cross member 15$^a$ forwardly to a point beneath the cross member 15$^b$. In order to permit the mowing machine to be backed or turned, the rear ends of the slats 9 are slightly upturned as indicated at 9$^a$ so as not to dig in the ground.

As heretofore stated, I have described and illustrated one form of my invention, but it will be distinctly understood that I do not propose to limit myself strictly thereto, since various changes and modifications thereof will immediately suggest themselves to those skilled in the art without departing from the spirit of my invention, the scope of which is defined by the following claims.

What I claim as new and desire to secure by Letters Patent is:—

1. A hay bunching attachment for mowing machines comprising an open-ended hay receptacle having side walls and a bottom, a frame mounted for longitudinal swinging movement within said receptacle above the bottom thereof, a hay engaging abutment carried by said frame adjacent each end thereof and extending in the direction of the bottom of said receptacle, and means for actuating said frame for selectively bringing said abutments to contact with the bottom of said receptacle for stopping the passage of hay therethrough.

2. A hay bunching attachment for mowing machines comprising an open-ended hay receptacle having side walls and a bottom, a pair of movable hay engaging abutments disposed transversely of said receptacle and spaced from each other in the direction of its length, and means for selectively actuating said abutments to effective position.

3. A hay bunching attachment for mowing machines comprising an open-ended hay receptacle having side walls and a bottom, a pair of movable hay engaging abutments disposed transversely of said receptacle and spaced from each other in the direction of its length, and means for simultaneously actuating either abutment to operative position and the other to inoperative position.

4. The combination with a mower including a wheeled body and having a reciprocatory cutter bar of an open-ended hay receiving receptacle carried by said finger bar, said receptacle having a bottom and raised sides, a frame rockably carried by said receptacle in spaced relation to the bottom thereof, hay engaging abutments carried adjacent either end of said frame extending in the direction of the bottom of said receptacle and being selectively actuated to engagement therewith upon rocking of said frame, and actuating means for said frame removably carried by the body of said mower.

In testimony whereof I affix my signature.

CRIST HERMINGHUYSEN.